United States Patent
Schoenstein et al.

(10) Patent No.: US 12,429,132 B2
(45) Date of Patent: Sep. 30, 2025

(54) PLANETARY GEARBOX HAVING A ROTATIONALLY FIXED THRUST WASHER OF THE PLANET BEARING

(71) Applicant: Schaeffler Technologies AG & Co. KG, Herzogenaurach (DE)

(72) Inventors: Frank Schoenstein, Baiersdorf (DE); Wolfgang Fugel, Nuremberg (DE); Andreas Kirschner, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/857,013

(22) PCT Filed: Apr. 24, 2023

(86) PCT No.: PCT/DE2023/100293
§ 371 (c)(1),
(2) Date: Oct. 15, 2024

(87) PCT Pub. No.: WO2023/208280
PCT Pub. Date: Nov. 2, 2023

(65) Prior Publication Data
US 2025/0264157 A1    Aug. 21, 2025

(30) Foreign Application Priority Data
Apr. 27, 2022  (DE) .................... 10 2022 110 183.5

(51) Int. Cl.
*F16H 57/04*    (2010.01)
*F16C 17/04*    (2006.01)
*F16H 57/08*    (2006.01)

(52) U.S. Cl.
CPC .......... *F16H 57/0479* (2013.01); *F16C 17/04* (2013.01); *F16H 57/082* (2013.01); *F16H 57/0482* (2013.01); *F16H 2057/085* (2013.01)

(58) Field of Classification Search
CPC ............... F16H 57/0479; F16H 57/082; F16H 57/0482; F16H 2057/085; F16C 17/04
See application file for complete search history.

(56) References Cited

U.S. PATENT DOCUMENTS

| 4,795,220 A |   | 1/1989 | Mori |
| 5,611,628 A | * | 3/1997 | Brouwer ................. F16C 17/08 384/220 |

(Continued)

FOREIGN PATENT DOCUMENTS

| DE | 4009968 A1 | 11/1990 |
| DE | 10216137 A1 | 10/2003 |

(Continued)

*Primary Examiner* — Justin Holmes
(74) *Attorney, Agent, or Firm* — Matthews Evans

(57) ABSTRACT

A planetary gearbox includes a planet carrier having stop faces, planet journals, planet bearings, planet gears and thrust washers. Each of the planetary gears is arranged on one of the planet journals by one of the planet bearings. Each thrust washer is arranged between the planet carrier and one of the planetary gears. Each thrust washer includes a first washer side and a second washer side facing away from the first washer side, a lower circumferential circular segment, and a wing formation arranged to rest on one of the stop faces. Each washer side includes recessed portions and raised portions, each arranged adjacent to one of the recessed portions. The recessed portions are arranged to supply a lubricant to one of the planet bearings. The wing formation extends from the lower circumferential circular segment outwardly in a tangential direction.

20 Claims, 4 Drawing Sheets

(56) References Cited

U.S. PATENT DOCUMENTS

| | | |
|---|---|---|
| 2018/0283532 A1 | 10/2018 | Ishino |
| 2019/0308351 A1 | 10/2019 | Fukuzawa et al. |
| 2020/0088291 A1 | 3/2020 | Payne et al. |

FOREIGN PATENT DOCUMENTS

| | | | | |
|---|---|---|---|---|
| DE | 10343842 A1 | | 5/2005 | |
| DE | 102009023328 A1 | | 12/2010 | |
| DE | 102013200240 A1 | | 7/2014 | |
| DE | 102016219008 A1 | | 4/2018 | |
| GB | 2192440 A | * | 1/1988 | ............. F16B 21/18 |
| JP | H0579095 U | * | 10/1993 | |
| KR | 20120084632 A | * | 7/2023 | |
| WO | 2023093939 A1 | | 6/2023 | |

* cited by examiner

PLANETARY GEARBOX HAVING A ROTATIONALLY FIXED THRUST WASHER OF THE PLANET BEARING

CROSS-REFERENCE TO RELATED APPLICATIONS

This application is the United States National Phase of PCT Appln. No. PCT/DE2023/100293 filed Apr. 24, 2023, which claims priority to German Application No. DE102022110183.5 filed Apr. 27, 2022, the entire disclosures of which are incorporated by reference herein.

TECHNICAL FIELD

The present disclosure relates to a planetary gearbox having a plurality of planetary gears, each of which is mounted rotatably about a planet journal arranged on a planet carrier, wherein at least one thrust washer is arranged axially between at least one planetary gear and the planet carrier on the respective planet journal in a rotationally fixed manner.

BACKGROUND

Such a planetary gearbox is known from DE 40 09 968 A1. The thrust washer disclosed here is intended as an axial sliding bearing of the planet bearings for the respective planetary gear. In this regard, the planetary gear is rotatably mounted radially on a planet bolt by means of the planet bearing. The thrust washer is seated axially between the planet bearing, the planetary gear and the planet carrier. A bearing surface is defined via the surface of the respective thrust washer, which is usually designed as a sliding bearing surface. The sliding bearing surface is designed differently from case to case. The thrust washers are provided with material formations extending radially outwards in a tab-like manner for rotational fixation. This prevents the respective thrust washer from rotating in relation to the planet carrier and, on the one hand, avoids frictional wear in the contact zone between the hardened thrust washer and the usually non-hardened planet carrier. On the other hand, undefined friction or sliding conditions between the thrust washer and the planetary gear are avoided.

DE 10 2013 200 240 A1 discloses a generic planetary gearbox having a plurality of planetary gears, each mounted rotatably about a planet journal arranged on a planet carrier in each case. A thrust washer seated on the planet journal is arranged between the respective planetary gear and the planet carrier as an axial sliding bearing of the respective planet bearing. The thrust washer is provided with wing formations that are designed to be mirror-symmetrical with respect to a vertical axis, which are also designed to be mirror-symmetrical with respect to a transverse axis that intersects the vertical axis at a right angle. The wings point away from one another axially in the washer plane without being angled and engage in an axial recess in the planet carrier. They come to rest against a corresponding stop face on the planet carrier in a form-fitting manner. The wing formations of the thrust washer are formed symmetrically such that they can be enclosed by a trapezoidal envelope geometry. The respective recess in the planet carrier has stop faces that are aligned with one another such that they have inner flanks that correspond to the envelope geometry, i.e., are aligned with one another in a trapezoidal shape.

A further planetary gearbox of this type is described in US 2018/0 283 532 A1. In this case, the geometry of the thrust washer is designed to be mirror-symmetrically identical around the vertical axis with respect to the wing formations. With their flanks facing away from one another and corresponding to the trapezoidal inner geometry, the wing formations strike the inner flanks of the axial recess in the planet carrier, which also describe a trapezoidal shape.

DE 10 2009 023 328 A1 discloses a planetary gearbox in which the thrust washers are provided with flanks that are mirror-symmetrically identical around the vertical axis and aligned parallel to one another. For the purpose of rotational fixation, one of the flanks strikes against a stop face of the planet carrier in each case, which is formed on a tangential undercut of the planet carrier.

US 2019/0 308 351 A1 discloses a flat thrust washer that has, on both washer sides, a plurality of recessed portions, the edges of which are open radially inwards and radially outwards, for supplying lubricant to a planet bearing.

SUMMARY

The present disclosure provides a planetary gearbox of the generic type having thrust washers of the planetary gears with a rotational fixation which is adapted to the shape of the corresponding planet carrier in a space-saving manner and resistant to bending.

For the purpose of rotational fixation, the thrust washer of the planetary gearbox has at least one wing formation which extends from a lower circumferential circular segment outwardly in the tangential direction without being angled, which comes to rest against a corresponding stop face on the planet carrier in a form-fitting manner and, has on both washer sides, a plurality of raised portions, the edges of which are open radially inwards and radially outwards, and recessed portions adjacent thereto for supplying lubricant to the planet bearing.

With such a configuration, tab segments on the thrust washer that are bent at right angles or at any other angle in the axial direction are omitted, which means that the entire thrust washer is designed as an essentially stretched flat component and is thus easier to manufacture. The wing formations extend in a radial plane in which the thrust washer or its basic shape also extends in an aligned manner, i.e., without being angled. The wing-like formations according to the disclosure are adapted to the annular disc-like basic shape of the thrust washer without being angled and are therefore more stable. This also forms the prerequisite for the special wing formation to be adapted to a corresponding contact surface of the planet carrier close to the bolt in order to save space. The thrust washer having a wing formation according to the disclosure may fit in a form-fitting manner in a corresponding pocket of the planet carrier and, in this regard, is supported on the connecting webs and not, as is usually the case, on the support flanges of the same. This means that the thrust washer according to the disclosure can be designed to be relatively short in the radial direction.

According to an example embodiment, it is proposed that the thrust washer has two wing formations which are arranged mirror-symmetrically with respect to a radial line R and gradually emerge from the basic circular shape of the thrust washer, the lateral tangential segments of which produce a V-shape. The thrust washer may be formed symmetrically with the wing formations such that it can be enclosed by a trapezoidal envelope geometry H. This symmetry results in a rotational fixation on both sides for the mounted thrust washer.

Within the aforementioned trapezoidal envelope geometry, the two lateral tangential segments of the V-shape may each open into an upper roof arch, the radius of curvature of which is much greater than the radius of the lower circumferential circular segment. A transition radius segment can further be formed between the, for example, straight lateral tangential segments, and the curved roof arch connecting them, in order to avoid sharp corners on the component.

In one embodiment, the raised portions are, in each case, provided with a thrust surface for the axial contact of a planetary gear on a first washer side and with a contact surface for contact with the planet carrier on a washer side facing away from the first washer side. The thrust surface forms the sliding surface of the axial sliding bearing, against which the rotating planetary gear contacts in a sliding manner. The contact surface is supported axially on the planet carrier directly or via a further washer, but is immovable relative to the planet carrier due to the rotational fixation of the thrust washer.

In an example embodiment, the thrust washer has a profiled central opening which is connected in a form-fitting manner with a corresponding segment of the planet journal for rotational fixation with respect to the latter.

According to a further embodiment, the thrust washer has a central opening with notches notched out at the edge of the opening or deformations, which form lubricant openings in operative connection with a segment of the planet journal corresponding thereto. The lubricant openings ensure that lubricant can be exchanged between the two washer sides. The notches are created when the washer is stamped. The deformations are formed by the axial and radial offset of the recessed portions in relation to the raised portions, which is created when the thrust washer is stamped due to the machining of the recessed portions.

The thrust washer according to the disclosure may be made as a stamped bent part from a metal sheet. This makes it easy from a production engineering perspective to ensure mass production with consistent quality.

According to a further embodiment, the raised portions and the recessed portions of the thrust washer made from a metal sheet merge axially into one another at a washer offset and the raised portions and the recessed portions have the same sheet thickness when compared with one another. The washer offset compensates for the axial difference between the raised and recessed portions. As a result, the axial washer thickness is greater than the thickness of the thrust washer in the recessed and raised portions.

As already described above, it is proposed that the thrust washer has, on both washer sides, a plurality of raised portions, the edges of which are open radially inwards and radially outwards, and recessed portions adjacent thereto for supplying lubricant to the planet bearing. This is because the recessed portions of the respective side form lubricant channels extending in the radial direction in interaction with the adjacent component. Usually, the planet bearings should also be able to be lubricated radially from the outside. As centrifugal forces occur during operation, the entrance of the collecting opening in the washer must be as large as possible. In the thrust washer according to the disclosure, at least one of the recessed portions extends partially to completely over at least one of the wing formations in order to form a maximally large inlet opening for lubricant radially towards the outside. This ensures a relatively larger pick-up volume of lubricant.

This allows the planet bearing of the planetary gears to be adequately supplied with lubricant, which may be designed as a needle bearing.

BRIEF DESCRIPTION OF THE DRAWINGS

Further measures are shown in more detail below together with the description of an exemplary embodiment based on the figures. In the drawings.

DETAILED DESCRIPTION

Figure 1:
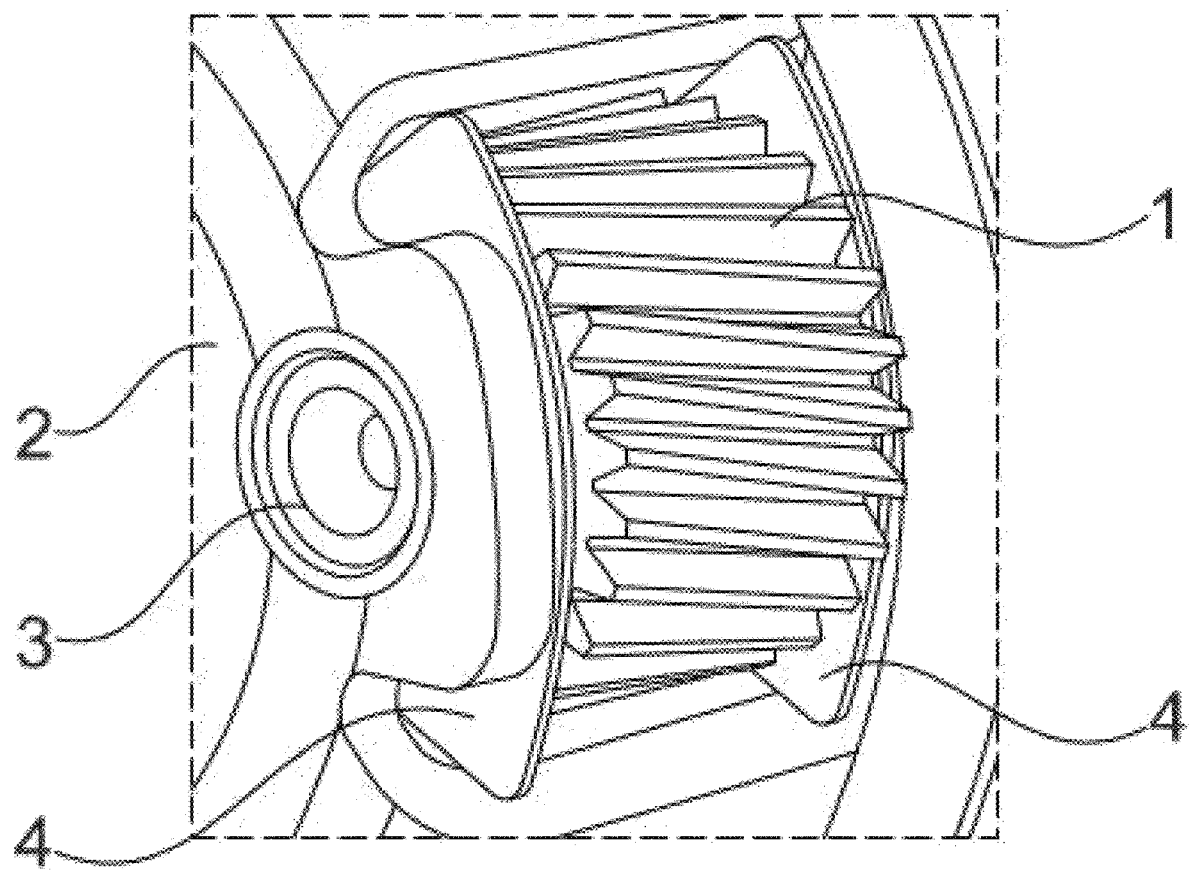
FIG. 1 shows a partial perspective view of a planetary gearbox in the region of an exemplary planetary gear.

According to FIG. 1, the planetary gearbox includes a plurality of (exemplary) planetary gears 1, each of which is mounted rotatably about a planet journal 3 arranged on a planet carrier 2 in each case. A thrust washer 4, shown in simplified form, is arranged axially on both sides between the planetary gear 1 and the planet carrier 2 on the planet journal 3 in a rotationally fixed manner.

Figure 2:
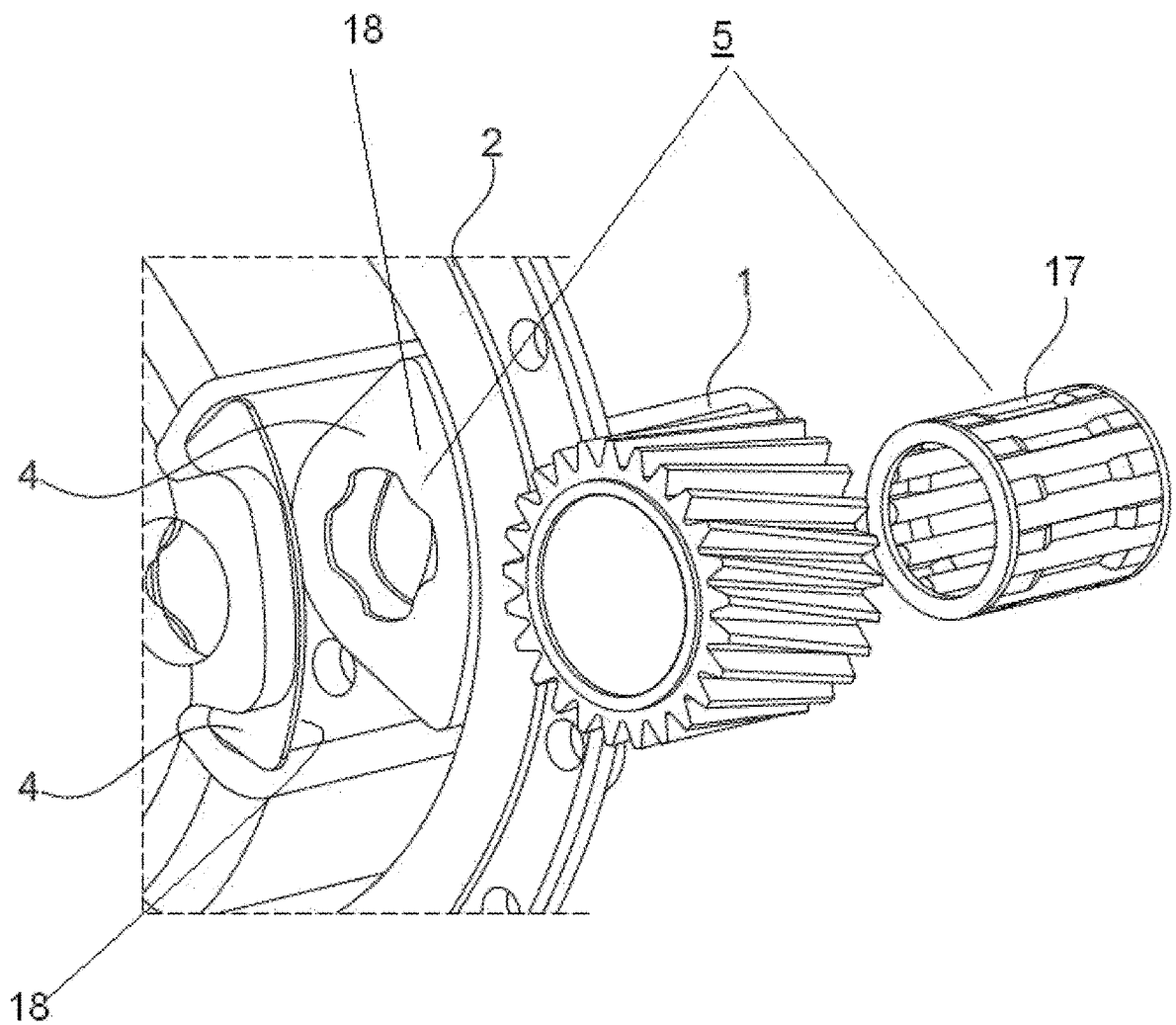
FIG. 2 shows the partial perspective view according to FIG. 1 in an exploded view.

According to FIG. 2, the planetary gear 1 is rotatably mounted on a planet journal (not shown here) by means of a planet bearing 5. The planet bearing 5 is formed by a radial bearing 17 designed as a needle bearing and an axial sliding bearing 18 provided by the thrust washer 4. The planet bearing 5 requires lubricant, which is provided by the thrust washers 4, shown in simplified form in this illustration, in the manner described below.

Figure 3:
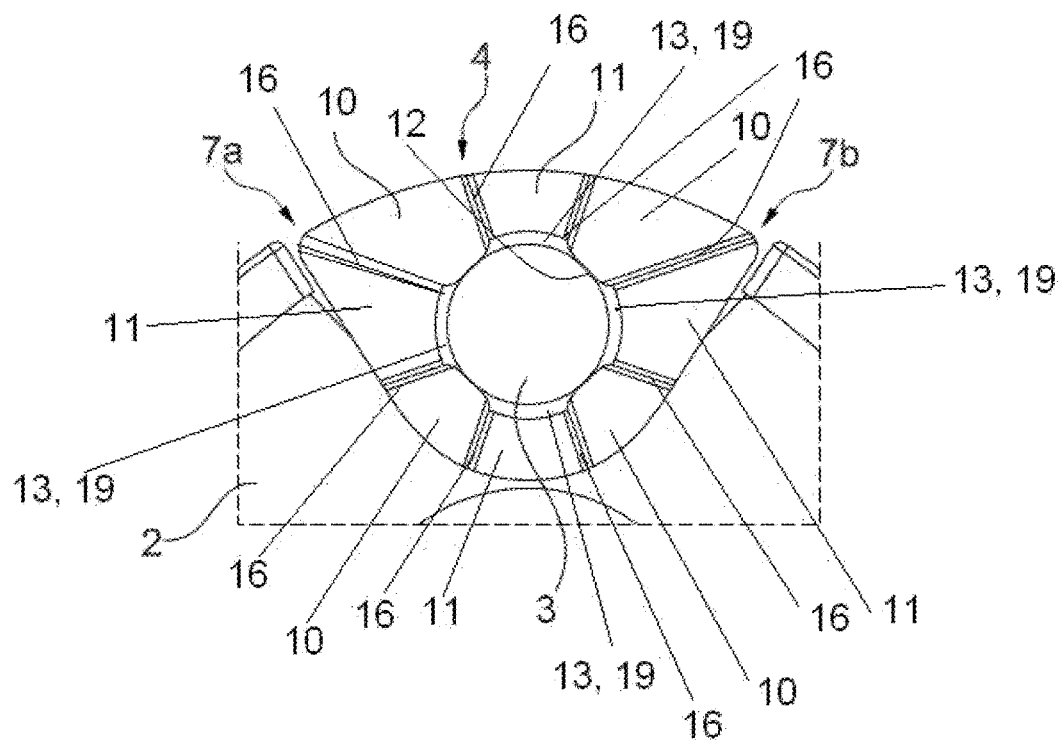
FIG. 3 shows a plan view of a thrust washer according to the disclosure mounted in the planet carrier, without planetary gear components.

According to FIG. 3, the exemplary thrust washer 4 has a plurality of raised portions 10, the edges of which are open radially inwards and radially outwards, and (exemplary) recessed portions 11 adjacent to these in an alternating manner for supplying lubricant to the planet bearing. In this regard, one of the recessed portions 11 extends completely over one of the two wing formations 7a in order to form a maximally large inlet opening for the lubricant towards the outside. The raised portions 10 and the recessed portions 11 of the thrust washer 4 made from a metal sheet merge axially into one another at a washer offset 16.

Furthermore, the thrust washer 4 has a central opening 12 with deformations 19 or notches or a combination of these formed at the edge of the opening 12, which form axial lubricant openings 13 in operative connection with a segment of the planet journal 3 corresponding thereto.

Figure 4:
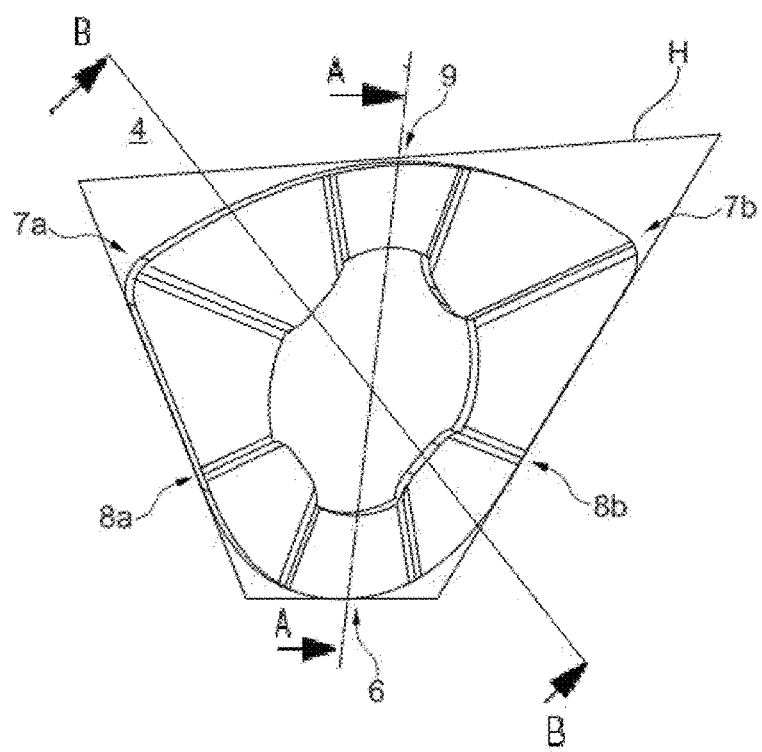
FIG. 4 shows a plan view of the thrust washer as an individual component.

With regard to FIG. 4, the exemplary thrust washer 4 is designed in such a way that it has two wing formations 7a and 7b which extend from a lower circumferential circular segment 6 outwardly in the tangential direction in a mirror-symmetrical manner without being angled. As already explained above, these two wing formations 7a and 7b serve to establish a form-fitting connection with a corresponding stop face on the planet carrier 2, which is not shown further here but can be seen in FIG. 1, for example. The mirror symmetry is provided with respect to a radial line R, which extends radially outwardly from the center of the axis of the planetary gearbox.

The straight lateral tangential segments 8a and 8b of the wing formations 7a and 7b produce a V-shape with an acute angle. The two lateral tangential segments 8a and 8b each open into an upper roof arch 9, the radius of curvature of which is much greater than the radius of the lower circumferential circular segment 6, which results from the basic annular disc shape of the thrust washer 4.

The exemplary thrust washer 4 is formed symmetrically with the wing formations 7a and 7b such that it can be enclosed by a trapezoidal envelope geometry H.

Figure 5:
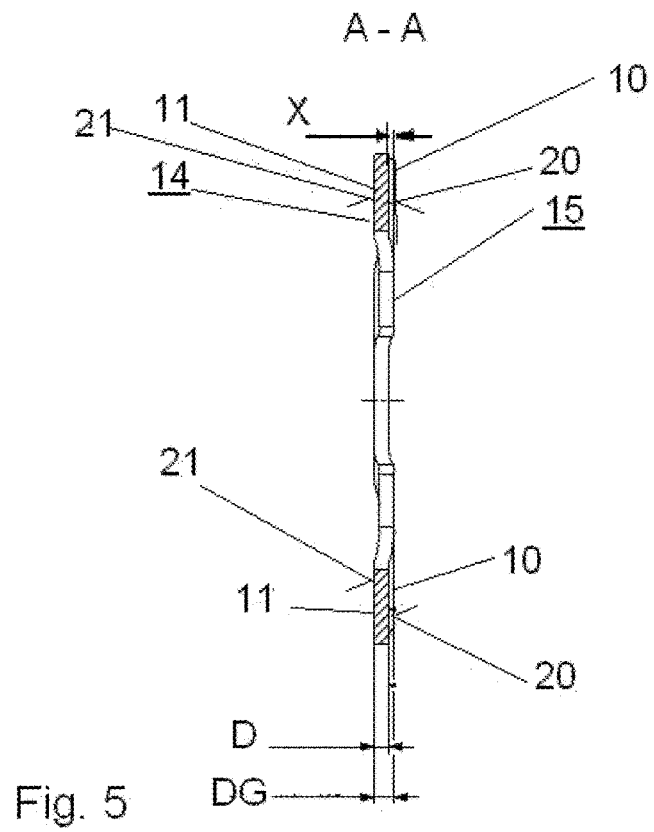
FIG. 5 shows the thrust washer in a longitudinal section along the line A-A in FIG. 4.
Figure 6:
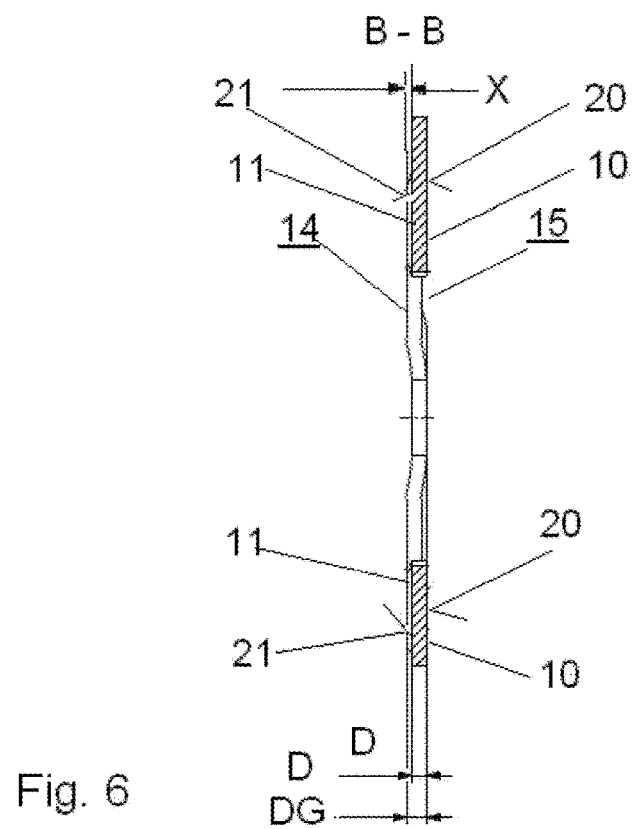
FIG. 6 shows the thrust washer in a longitudinal section along the line B-B in FIG. 4

FIGS. 5 and 6 show that the raised portions 10 and the recessed portions 11 of the thrust washer 4 made from a metal sheet merge axially into one another at a washer offset 16. The total washer thickness DG is made up of the sheet thickness D and the axial difference X between the raised and recessed portions. The raised portions 10 and the recessed portions 11 have the same sheet thickness D when compared with one another. Thrust surfaces 20 of the axial sliding bearing 18 are formed on the raised portions 10 of the first washer side 14. Contact surfaces 21 are formed on the recessed portions 11 of the second washer side 15 for contact with the planet carrier shown in FIGS. 1 and 2. The recessed portions 11 are formed, in each case, on the rear side of the contact surfaces 21 and the thrust surfaces 20. A contact surface 21 is formed on the rear side of each recess 11.

The disclosure is not restricted to the exemplary embodiment described above. Rather, deviations therefrom are also conceivable that are included within the scope of protection of the following claims. For example, it is also possible to attach only one of the wing formations to a thrust washer for the purpose of rotational fixation. However, this restricts the running direction of the planetary gearbox.

REFERENCE NUMERALS

1 Planetary gear
2 Planet carrier
3 Planet journal
4 Thrust washer
5 Planet bearing
6 Circumferential circular segment
7 Wing formation
8 Tangential segment
9 Roof arch
10 Raised portion
11 Recessed portion
12 Opening
13 Lubricant opening
14 First washer side
15 Second washer side
16 Washer offset
17 Radial bearing
18 Axial sliding bearing
19 Deformation
20 Thrust surfaces
21 Contact surface
D Thickness of the sheet
DG Total thickness of the thrust washer
X Difference
H Envelope geometry
R Radial line

The invention claimed is:

1. A planetary gearbox comprising:
a plurality of planetary gears, each one of the plurality of planetary gears mounted rotatably about one planet journal arranged on a planet carrier via a planet bearing,
at least one thrust washer of the planet bearing is:
arranged as an axial sliding bearing with two washer sides facing away from one another,
arranged axially between at least one planetary gear and the planet carrier on the planet journal, and
rotationally fixed on the planet carrier, and
wherein:
the at least one thrust washer has at least one wing formation configured for rotational fixation, the at least one thrust washer extending from a lower circumferential circular segment outwardly in a tangential direction without being angled, and resting against a corresponding stop face on the planet carrier, and
the at least one thrust washer has, on both washer sides, a plurality of recessed portions, and edges of the plurality of recessed portions are open radially inwards and radially outwards for supplying lubricant to the planet bearing, and
the thrust washer has, on both washer sides, a plurality of raised portions arranged adjacently to the recessed portions and the edges of the plurality of raised portions are open radially inwards and radially outwards.

2. The planetary gearbox according to claim 1, wherein the thrust washer has two wing formations arranged mirror-symmetrically with respect to a radial line, and lateral tangential segments of the two wing formations produce a V-shape.

3. The planetary gearbox according to claim 2, wherein the thrust washer is formed symmetrically with the two wing formations such that it can be enclosed by a trapezoidal envelope geometry.

4. The planetary gearbox according to claim 2, wherein the lateral tangential segments each open into an upper roof arch, a radius of curvature of which is greater than a radius of the lower circumferential circular segment.

5. The planetary gearbox according to claim 4, wherein a transition radius is formed between the lateral tangential segments and the upper roof arch connecting them.

6. The planetary gearbox according to claim 1, wherein the raised portions are provided with a thrust surface for axial contact of a planetary gear on a first washer side of the washer sides and with a contact surface for contact with the planet carrier on a second washer side of the washer sides facing axially away from the first washer side.

7. The planetary gearbox according to claim 1, wherein the thrust washer has a central opening with deformations formed at an edge of the opening, which form axial lubricant openings in operative connection with a segment of the planet journal corresponding thereto.

8. The planetary gearbox according to claim 1, wherein the thrust washer is constructed as a stamped bent part from a metal sheet.

9. The planetary gearbox according to claim 1, wherein the raised portions and the recessed portions of the thrust washer merge axially into one another at a washer offset and the raised portions and the recessed portions have a same sheet thickness when compared with one another.

10. The planetary gearbox according to claim 1, wherein at least one of the recessed portions extends at least partially over at least one of the at least one wing formation to form a maximum outside inlet opening for lubricant.

11. A planetary gearbox comprising:
a planet carrier comprising a plurality of stop faces;
a plurality of planet journals;
a plurality of planet bearings;
a plurality of planetary gears, each one arranged on a one of the plurality of planet journals by a one of the plurality of planet bearings; and a plurality of thrust washers, each one arranged between the planet carrier and a one of the planetary gears and comprising:
- a first washer side and a second washer side facing away from the first washer side, each one of the first washer side and the second washer side comprising:
  - a plurality of recessed portions having edges open radially inwards and radially outwards, the recessed portions arranged to supply a lubricant to a one of the plurality of planet bearings; and
  - a plurality of raised portions, each one arranged adjacently to a one of the plurality of recessed portions, having edges open radially inwards and radially outwards;
- a lower circumferential circular segment; and
- a wing formation arranged to rest on a one of the plurality of stop faces to rotationally fix the thrust washer on the planet carrier, the wing formation extending from the lower circumferential circular segment outwardly in a tangential direction.

12. The planetary gearbox according to claim 11, wherein each one of the plurality of thrust washers comprises a pair of wing formations arranged mirror symmetrically with respect to a radial line such that respective lateral tangential segments of the pair of wing formations form a V-shape.

13. The planetary gearbox according to claim 12, wherein each one of the plurality of thrust washers is formed symmetrically such that is can be enclosed by a trapezoidal envelope geometry.

14. The planetary gearbox according to claim 12, wherein each respective lateral tangential segment opens into an upper roof arch having a radius greater than a radius of the lower circumferential circular segment.

15. The planetary gearbox according to claim 14, further comprising a pair of transition radii, each formed between one of the respective lateral tangential segments and the upper roof arch.

16. The planetary gearbox according to claim 11, wherein each of the plurality of raised portions comprises:
- a thrust surface for axial run-up of a planetary gear on the first washer side; and
- a contact surface with the planet carrier on the second washer side.

17. The planetary gearbox according to claim 11, wherein:
- each one of the plurality of planet journals comprises a segment; and
- each one of the plurality of thrust washers further comprises a central breakthrough having an edge and deformations formed at the edge, the deformations forming axial lubricant openings operatively connected with a respective segment.

18. The planetary gearbox according to claim 11, wherein each one of the plurality of thrust washers is made as a stamped bent part from a metal sheet.

19. The planetary gearbox according to claim 18, wherein the raised portions and the recessed portions of each thrust washer have a same sheet thickness and merge axially into one another at a washer offset.

20. The planetary gearbox according to claim 11, wherein a one of the recessed portions of each thrust washer extends at least partially over the wing formation to form a maximum outside inlet opening for the lubricant.

* * * * *